(12) United States Patent
Nakajima

(10) Patent No.: US 7,551,431 B2
(45) Date of Patent: Jun. 23, 2009

(54) ELECTRONIC DEVICE WITH ROTATABLE DISPLAY PANEL

(75) Inventor: Yuji Nakajima, Tokyo (JP)

(73) Assignee: Kabushiki Kaisha Toshiba, Tokoyo (JP)

( * ) Notice: Subject to any disclaimer, the term of this patent is extended or adjusted under 35 U.S.C. 154(b) by 0 days.

(21) Appl. No.: 11/584,785

(22) Filed: Oct. 19, 2006

(65) Prior Publication Data

US 2007/0285881 A1 Dec. 13, 2007

(30) Foreign Application Priority Data

Jun. 7, 2006 (JP) ............................. 2006-158815

(51) Int. Cl.
*H05K 5/03* (2006.01)
(52) U.S. Cl. ................... 361/681; 361/680; 248/920
(58) Field of Classification Search ................. 361/681, 361/680; 248/920
See application file for complete search history.

(56) References Cited

U.S. PATENT DOCUMENTS 4,547,027 A * 10/1985 Scheibenreif ................. 439/13

7,133,280 B2 * 11/2006 Love ........................ 361/681
7,187,539 B2 * 3/2007 Kim .......................... 361/681

FOREIGN PATENT DOCUMENTS

| JP | 2005-151057 | 6/2005 |
| JP | 2005-826431 | 10/2005 |
| JP | 2005-347903 | 12/2005 |

* cited by examiner

*Primary Examiner*—Jayprakash N Gandhi
*Assistant Examiner*—Ingrid Wright
(74) *Attorney, Agent, or Firm*—Blakely, Sokoloff, Taylor & Zafman LLP.

(57) ABSTRACT

According to one embodiment, an electronic device includes a main body having a housing, a display panel having a screen and a hinge mechanism connecting the main body and the display panel. Positioned along a rotational axis to allow the display panel to rotate with respect to the main body, the hinge mechanism includes a first indicator and a second indicator showing respective rotational directions with respect to the rotational axis. The directions of the first indicator and the second indicator are opposite to each other.

18 Claims, 8 Drawing Sheets

ELECTRONIC DEVICE WITH ROTATABLE
DISPLAY PANEL

CROSS-REFERENCE TO RELATED APPLICATIONS

This application is based upon and claims the benefit of priority from the prior Japanese Patent Application No. 2006-158815, filed Jun. 7, 2006, the entire contents of which are incorporated herein by reference.

BACKGROUND

1. Field

Embodiments of the present invention relate to an electronic device equipped with a hinge mechanism that allows positioning of a display panel in such ways that in one case a display screen is facing down on a main body and in another case the display screen is laying face up away from the main body.

2. Description of the Related Art

Currently, there are portable electronic devices that allow rotation of the display panel by 180 degrees with respect to the main body. In this type of the electronic device, there is a possibility of damaging the hinge portion when the display panel is rotated inadvertently more than 180 degrees.

In order to mitigate the possibility of damage, these electronic devices display an image, on a portion of the display screen, indicating the allowed rotational direction from the current state. However, in such electronic devices, built-in sensors and switches are required around the hinge to detect the rotational position. In addition, there is a need for a built-in control function to display the rotational direction that would operate in conjunction with the sensors and switches. When sensors and switches are incorporated into the hinge assembly, the hinge assembly becomes very complex and its production cost will increase.

Also, in such electronic device mentioned above, the allowed rotational direction of the display panel cannot be known unless the display device is activated. If the display panel is very small as in the case of a portable phone, the point of applied force and the action point are very close to the hinge mechanism. Therefore, the torque applied to the hinge mechanism is very small even if the user rotates the display panel in the wrong direction, and the possibility of damaging the hinge mechanism is very small.

However, when the display panel is larger, the rotational resistance of the hinge mechanism is purposely set higher so that the display panel does not rotate unintentionally due to its own weight. Because of this high rotational resistance setting, the user, when trying to rotate the display panel, may have a difficult time determining whether the panel is difficult to rotate because of the high resistance setting of the hinge mechanism or whether he is attempting to rotate the panel in the wrong mechanical direction.

In this case, unless there is a rotational direction indicator, the user may try to rotate the panel in both directions in order to find out which way the panel may rotate. When the panel size gets larger, the point of the applied force and the action point get farther away from the hinge mechanism. As a result, even if a small force is used to rotate the panel in the wrong mechanical direction, a large force is applied to the hinge mechanism, and there is a danger of damaging the hinge mechanism.

DETAILED DESCRIPTION

Hereinafter, embodiments of the present invention are explained below according to a set of drawings showing how the embodiments apply to a portable computer.

Figure 1:
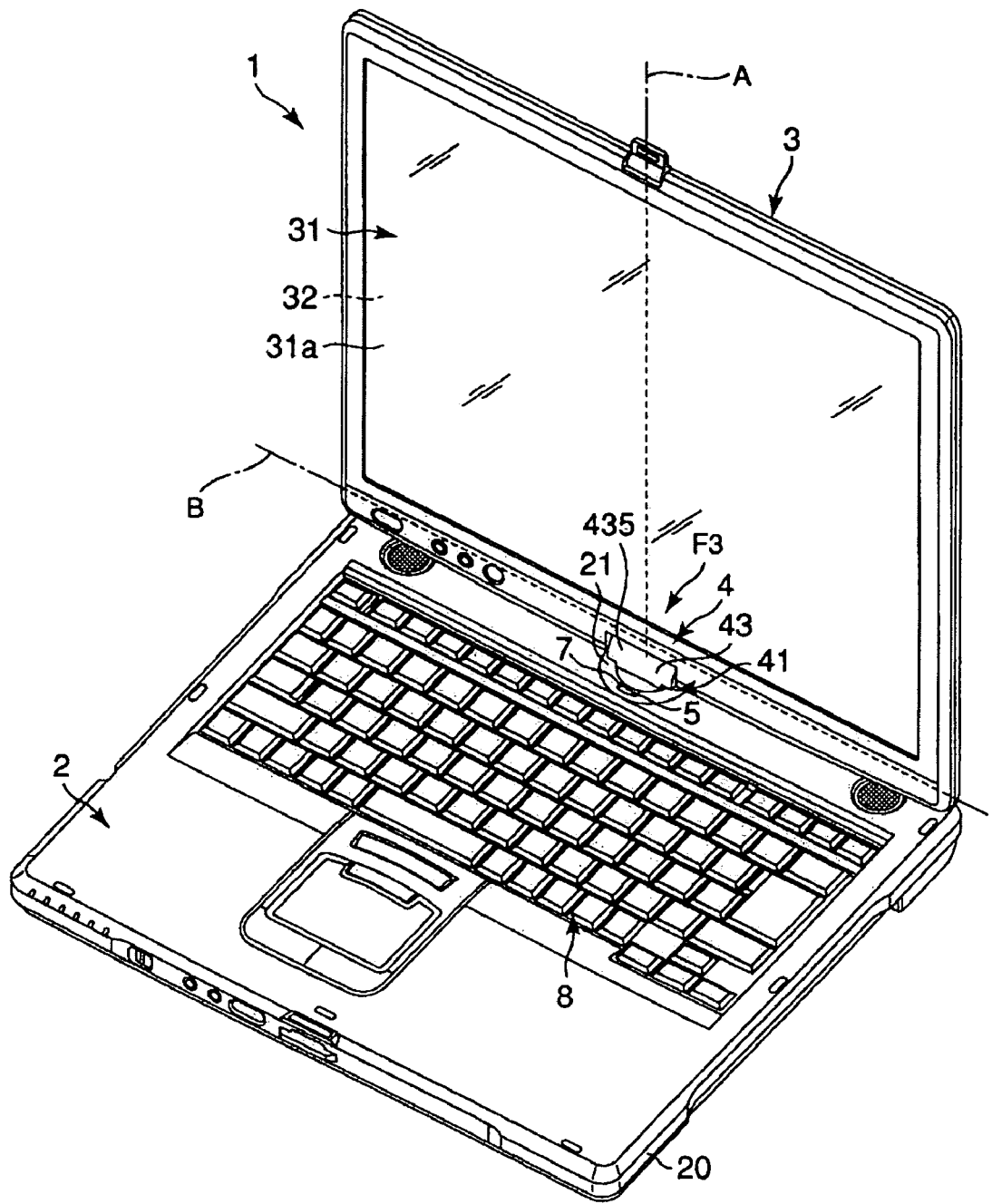
FIG. 1 is an exemplary perspective view of a portable computer conforming to the first embodiment of the present invention.
Figure 2:
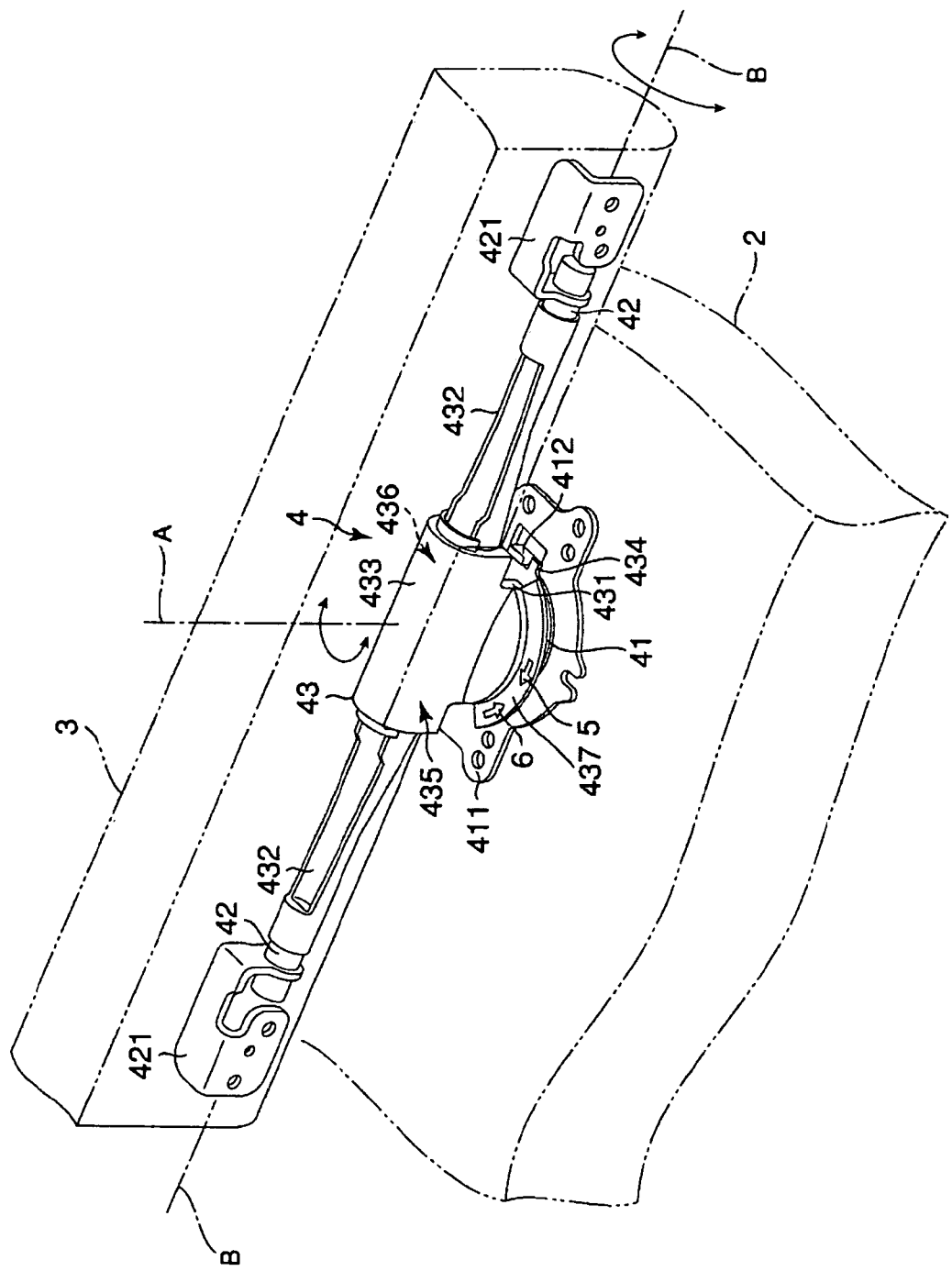
FIG. 2 is an exemplary perspective view of the hinge mechanism of the portable computer conforming to the first embodiment of the present invention.

The portable computer 1 shown in FIGS. 1 and 2 comprises a main body 2, a display panel 3, a hinge mechanism 4, first rotation arrows 5, second rotation arrows 6, and indication windows 7. For the convenience of describing this embodiment, the following assumptions and definitions are made: the main body 2 is placed on a table; a user is facing the portable computer; the terms "right" and "left" are with respect to the user; the term "front" is closer to the user while the term "back" is farther away from the user; and the terms "upper" and "lower" are with respect to the perpendicular line.

As shown in FIG. 1, the main body 2 has a housing 20 forming an outer shell, built-in memory devices, and built-in circuit boards with mounted components such as CPU. At the top of the housing 20, a keyboard 8 that is one example of an input device is installed. The display panel 3 has a built-in liquid crystal display 31 and digitizer 32. The liquid crystal display 31 is just an example of a display device. A display screen 31a is positioned to be seen from one side of the display panel 3. Instead of the liquid crystal display 31, other display devices such as a plasma display, organic electroluminescence, surface conductor type electron emission element display may be used.

The digitizer 32 is an example of input means that allows an input operation related to the image being displayed on the display screen 31a of liquid crystal display 31. Instead of the digitizer 32, the touch panel can be layered on the display screen 31a of the liquid crystal display 31.

As shown in FIG. 2, the hinge mechanism contains a first member 41 oriented along a rotational axis (hereinafter referred to as "rotational axis 41"), a second member 42 oriented along a deployment axis (hereinafter referred to as "deployment axis 42") and a rotation support part 43, and connects the main body 2 and the display panel 3. The rotational axis 41 is located near the back of the main body 2 and placed at the center width-wise. The rotational axis 41 allows the display panel 3 to rotate about an axis A that extends vertically from the main body 2. At the bottom of the rotational axis 41, a base plate 411 is installed in order to bond with the main body 2. The base plate 411 has a stopper 412 that limits the rotational angle of the rotation support part 43 with respect to the rotation axis 41.

The deployment axis 42 allows the display panel 3 to deploy about an axis B from the closed position of laying over the main body 2 to the open position of standing up with respect to the main body 2. In addition, there is sufficient friction resistance in deployment so that the display panel 3 can be maintained at any desired position of deployment (the open state). In other words, the deployment axis 42 not only allows the display panel 3 to open or close but also maintains the display panel 3 at any angular position with respect to the main body 2. The axis B is positioned along the back end of the display panel 3 referenced to the closed state in which the display panel 3 is laying over the main body 2. The deployment axis 42 has arms 421 that extend in radial direction from the axis B. Arms 421 are attached to the internal portion of the display panel 3.

Figure 5:
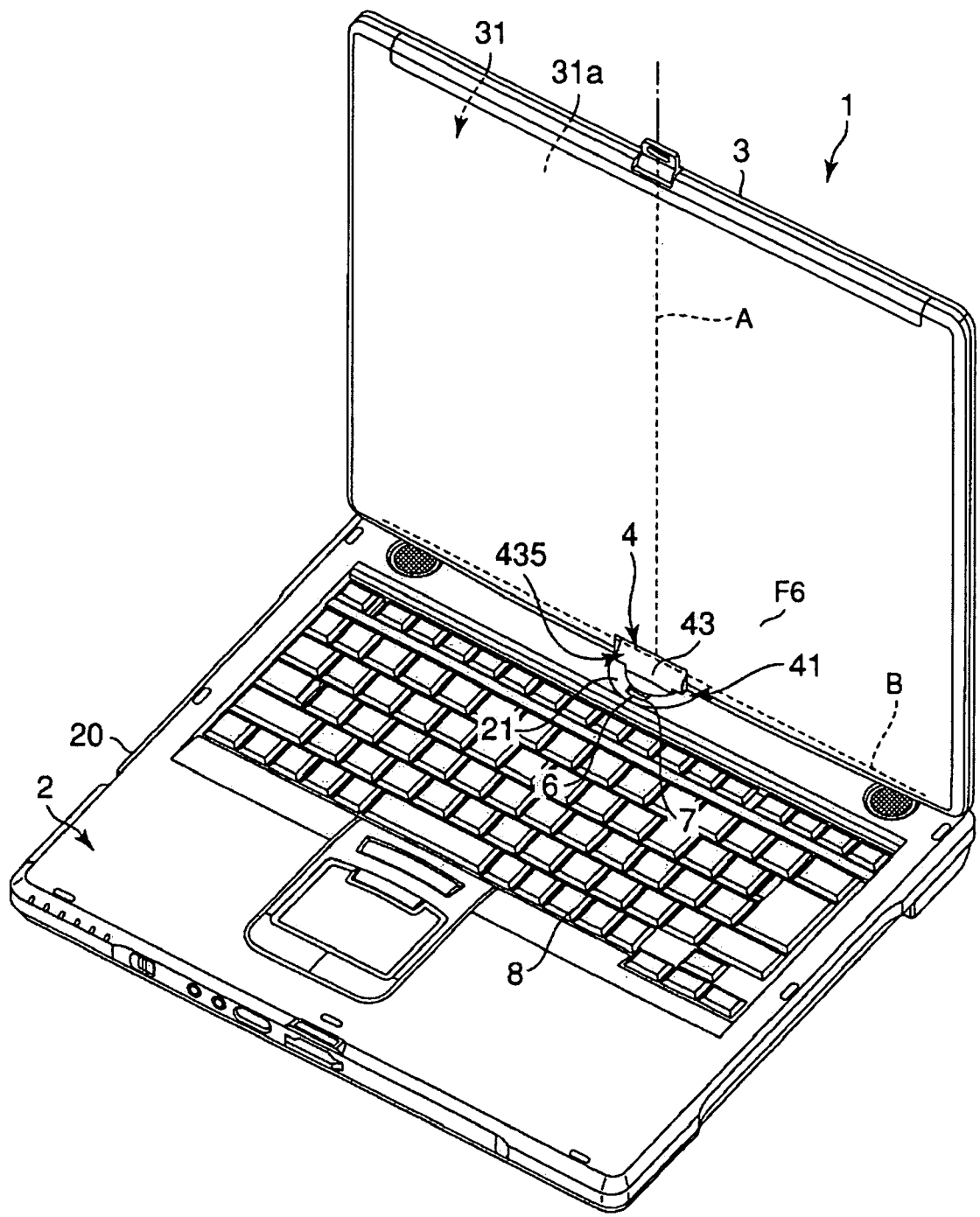
FIG. 5 is an exemplary perspective view showing the display panel of the portable computer rotated 180 degrees about the rotational axis.
Figure 6:
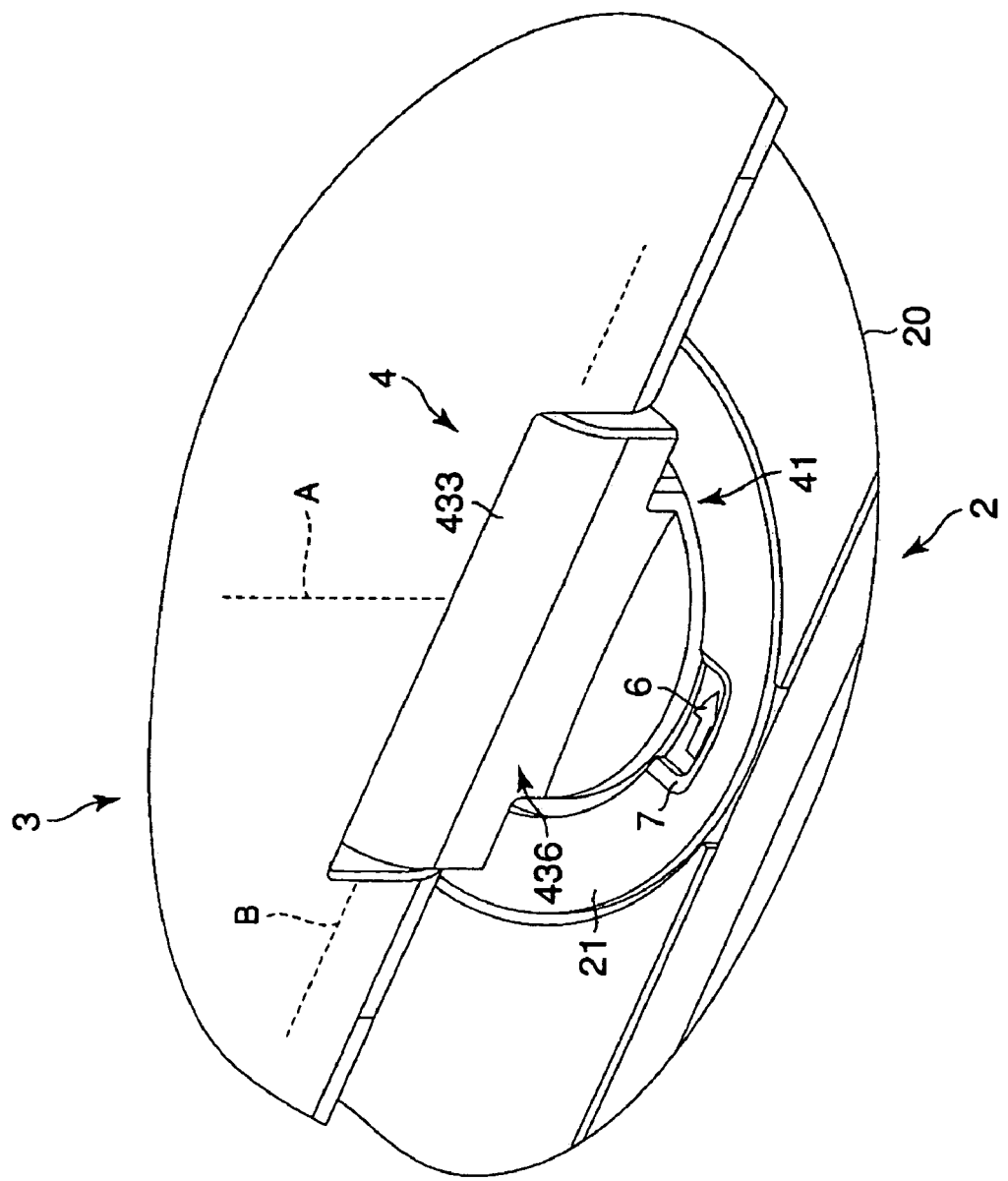
FIG. 6 is an expanded view of the F7 portion of FIG. 5.

A rotation support part 43 has a trunk section 431, a support arm 432 and a hinge cover 433. The lower portion of the trunk section 431 is coupled to and rotates in concert with the rotational axis 41. The trunk section 431 has a hollow cavity in which the rotational axis 41 runs through along the axis A, and also has an engaging piece 434, at the lower edge, that extends out from the axis A. The engaging piece 434 engages the stopper 412 when the display panel 3 is rotated about the axis A and reaches the state as shown in FIG. 1 in which the display screen 31a is facing forward toward the keyboard 8. The engaging piece 434 also engages the stopper 412 when the display panel 3 is rotated all the way and reaches the state as shown in FIG. 5 in which the display screen 31a is facing to the rear, in other words the back of display panel 3 is facing toward keyboard 8.

The support arms 432 extend out along the axis B from the upper portion of the trunk section 431. The end of each support arm 432 is attached to the deployment axis 42. The portion between the two ends of the support arms 432 is carved out along the axis B as if the upper portion were opened up. The cable connecting from the circuit board within the main body 2 to the liquid crystal display 31 and the digitizer 32 is routed along the inside of the trunk section 431 and the support arms 432.

Having the configuration described above, the rotation support part 43 can integrate the rotational axis 41 and the deployment axis 42 in such state that these axes intersect each other. In this embodiment, these axes are intersecting orthogonally.

A hinge cover 433 is shaped as a saddle and covers over the trunk section 431 as shown in FIG. 2, and its hem sections 437 and 438 are buried under the main body 2. The housing 20 of the main body 2 has a cover 21 (see FIG. 1) that covers up the hem sections 437 and 438 of the hinge cover 433 with a single flat top surface.

First and second rotation arrows 5 and 6 are provided on the hem sections 437 and 438 of the hinge cover 433 of the rotation support part 43 in the region where they are covered by the cover 21 extending to be substantially flush with a top surface of the main body 2.

Figure 3:
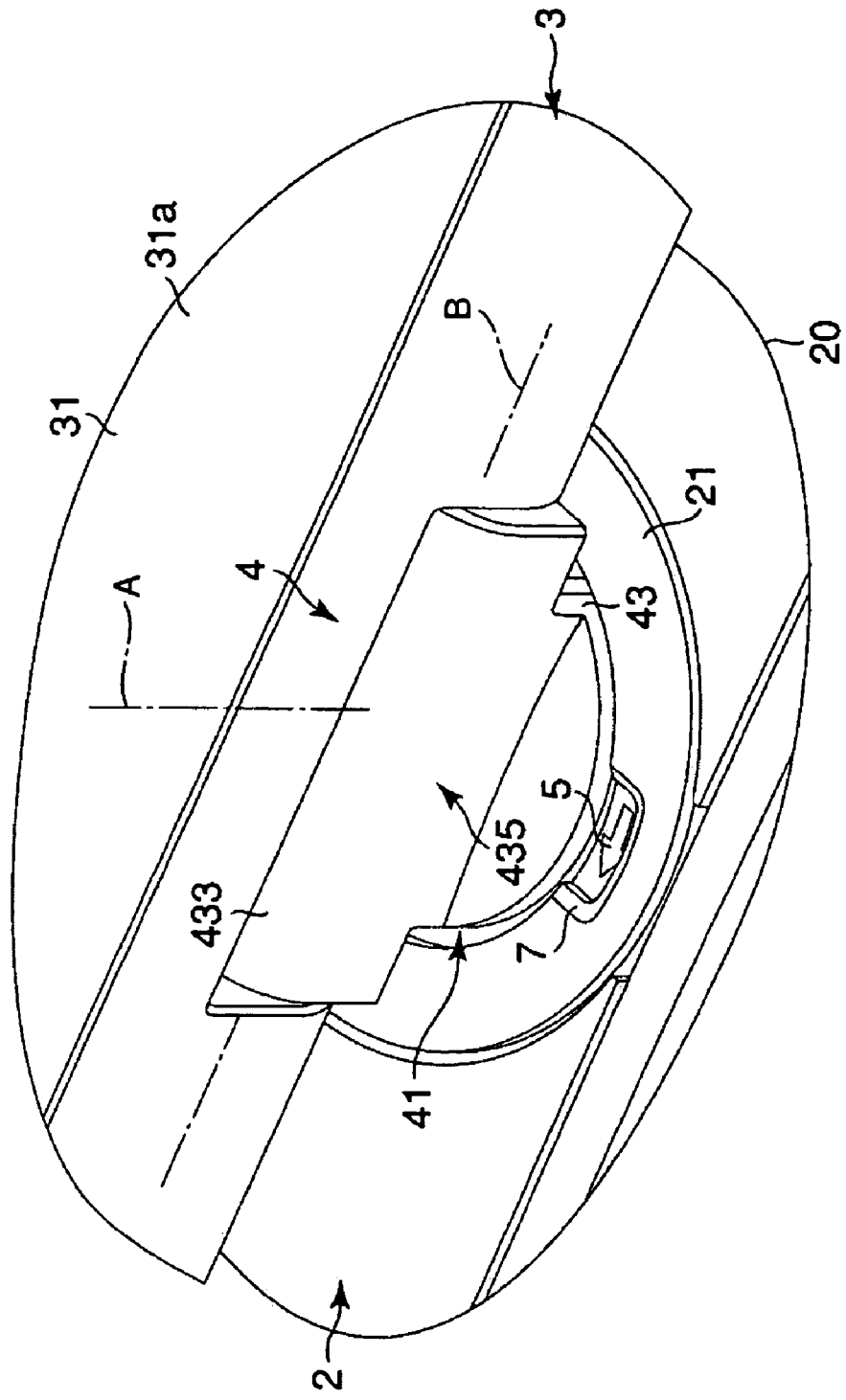
FIG. 3 is an expanded view of the F3 portion of FIG. 1.
Figure 4:
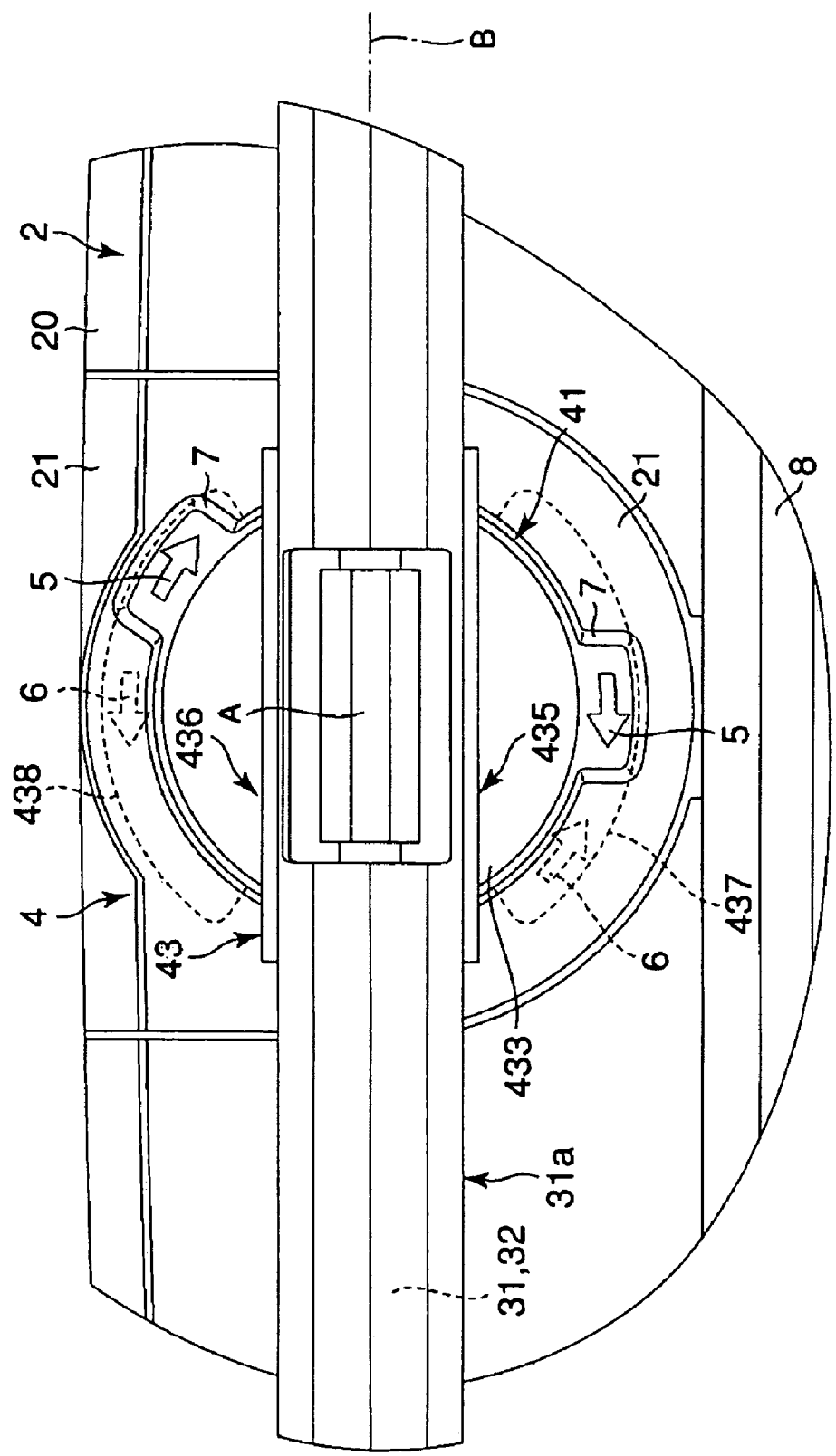
FIG. 4 is an exemplary plane view of the area near the hinge mechanism of the portable computer conforming to the first embodiment of the present invention.
Figure 7:
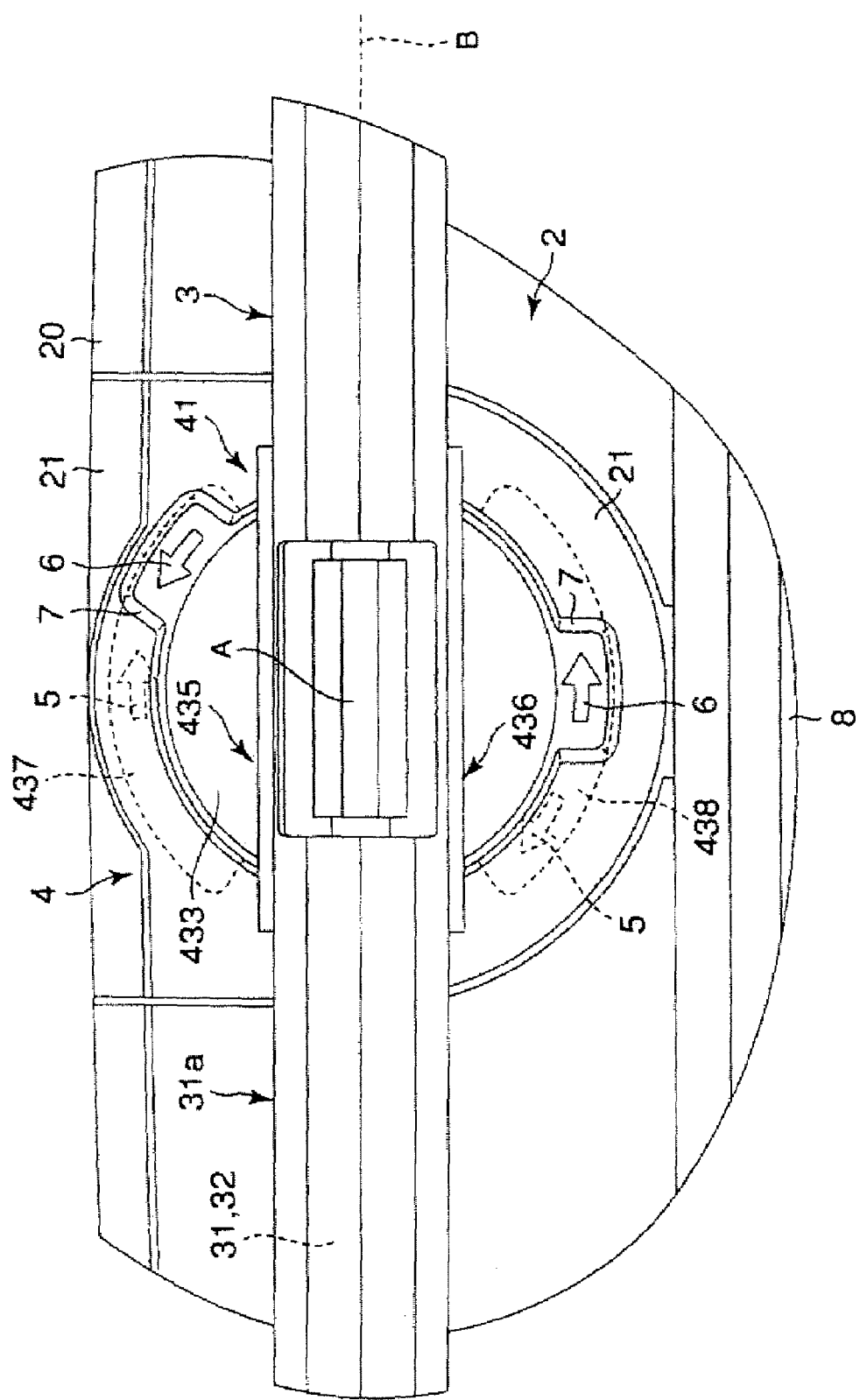
FIG. 7 is an exemplary plane view of the area near the hinge mechanism of the portable computer conforming to the first embodiment of the present invention.

As shown in FIGS. 3 and 4, each of first rotation arrows 5 shows the arrow for the first rotational direction with respect to the rotational axis 41 that is the clockwise rotational direction in this embodiment. The clockwise rotation will move the display screen 31a toward left as seen by the user. As shown in FIGS. 4 and 7, one each of first rotation arrows is positioned at the operational side 435 and the non-operational side 436 of the rotation support part relative to the display screen 31a.

As shown in FIGS. 4 and 7, second rotation arrows 6 are located symmetric to first rotation arrows 5 with respect to the rotational axis 41. In other words, second rotation arrows 6 are pointed 180 degrees away from the respective first rotation arrows 5. Each second rotation arrow 6 shows the arrow as opposite to the first rotation arrow 5, which points in the counter-clockwise direction in this embodiment. The counter-clockwise rotation will move the display screen 31a toward the right as seen by the user.

First rotation arrows 5 at the operational side 435 and the non-operational side 436 are not positioned symmetrically about the rotational axis 41, that is they are not positioned at 180 degrees apart from each other. The same is true for second rotation arrows 6.

As shown in FIGS. 3, 4, 6 and 7, the indication windows 7 are opened on the top surface of the cover 21 at the keyboard 8 side and the back side with respect to the rotational axis 41. Two indication windows 7 are positioned such that either the pair of first rotation arrows 5 or the pair of second rotation arrows can be seen simultaneously. To do so, two indication windows 7 are arranged in non-symmetric locations similar to the arrangement of the first and second rotation arrows 5 and 6.

In this embodiment, when the display screen 31a is facing toward the keyboard 8 as shown in FIG. 1, first rotation arrow 5 is seen through the indication window 7 as shown in FIG. 4. When the back side of the display panel 3, which is the opposite side of the display screen 31a, is facing toward the keyboard 8 as shown in FIG. 5, second rotation arrow 6 is seen through the indication window 7 as shown in FIG. 7.

In the portable computer 1 configured as described above, when the display panel 3 is rotated from the state shown in FIG. 1 to the state shown in FIG. 5, the user who is performing the input operation at the keyboard 8 would know immediately which way the panel should be rotated simply by verifying what is shown in the indication window 7 as shown in FIG. 2.

Figure 8:
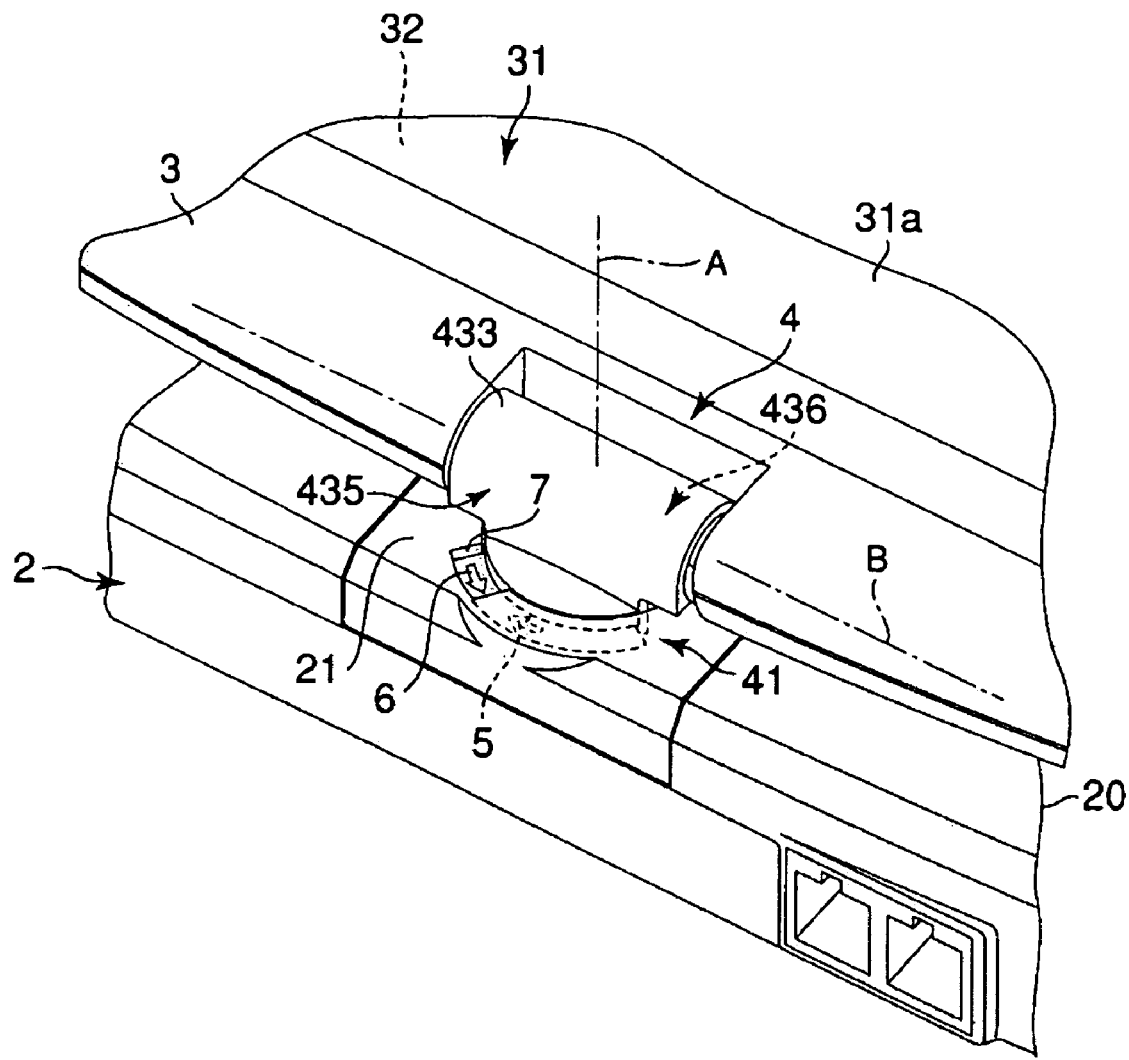
FIG. 8 is an exemplary view looked at from the rear when the display panel of portable computer is pushed down on the main body.

Also, when the input operation is being performed from the digitizer 32 of the display screen 31a that is laying face up as the display panel 3 overlaying on top of the main body 2, the indication window 7 shown in FIG. 2 is hidden by display panel 3. Even in this situation, the electronic device 3 of this invention provides another visible indication window 7 behind the rotational axis 41 as shown in FIG. 8. By looking at this visible indication window 7 behind the rotational axis 41, the user would immediately know which way the display panel 3 should be rotated.

When switching the input operation mode from digitizer 32 to the keyboard 8 by rotating the display panel 3 from the state shown in FIG. 8 to the state shown in FIG. 1, a user may perform the repositioning of the display panel 3 from the keyboard 8 side. The user may first stand up the display panel 3 as shown in FIG. 5. Then, the user rotates the display panel 3 about the rotational axis 41 while the user is situated at the keyboard 8 side. Throughout the above maneuver, the user can find the proper rotational direction by looking at clearly visible indication window 7 since there are two indication windows 7 located at both sides of the rotational axis 41 of the hinge mechanism, one at the keyboard 8 side and the other at the backside of the main body 2.

The following situation illustrates usage of the portable computer 1 deploying an embodiment of this invention. Two businessmen are having a business discussion while seated facing each other with this portable computer 1 positioned between them. The provider of the information may perform an input operation through the keyboard 8. Then, the provider rotates the display panel 3 about the rotational axis 41 to show the information displayed on the display screen 31a to the other party. In this case, both men, one who performs the input operation from the keyboard 8 while seated and the other who views the display screen 31a while seated at the backside of the main body 2, can find out easily the proper direction to rotate the display panel 3 with respect to the rotational axis 41. Therefore, the portable computer 1 of this invention can prevent the display panel 3 from being rotated inadvertently in a wrong direction.

All of first rotation arrows 5 and second rotation arrows 6 are positioned on the rotation support part 43 of the hinge mechanism 4, and they rotate together with the display panel 3. If the user is looking at the indication window 7, he can see the first rotation arrow 5 or second rotation arrow 6 moving in the same rotational direction as the display panel 3. Therefore, this will help the user to feel and understand the direction of rotation. Since the rotation arrows are displayed even when the portable computer 1 is not activated, it is easy to find the proper rotational direction of the display panel 3 at any time.

The first rotation arrows 5, the second rotation arrows 6, and the indication windows 7 are provided by fabricating the portions of the rotation support part 43 and the cover 21 that are components of the portable computer 1 equipped with the hinge mechanism 4 for rotating the display panel 3. Therefore, no additional parts are needed to provide the rotational direction indicators for the display panel 3, and these can be provided by a simple fabrication process.

In this embodiment, the first rotation arrows 5 and second rotation arrows 6 are expressed by arrows. However, other signs may be used instead of arrows for the first rotation arrows 5 and the second rotation arrows 6.

Also, in this embodiment, the first rotation arrows 5 are positioned non-symmetrically with respect to each other but on the circle of the same radius. The second rotation arrows 6 are also arranged in the same manner. However, the first rotation arrows 5 can also be positioned such that the radial distance from the rotational axis 41 at the non-operational side 436 is offset from that of the operational side 435 while attaining the same intended function. The same is also applicable to the second rotation arrows 6.

In this case, the second rotation arrow 6 corresponding to the respective the first rotation arrow 5 should be located on a circle of the same radius and at a symmetric location with respect to the rotational axis 41. If the first rotation arrow 5 and the second rotation arrow 6 are arranged in the same radial direction, then the diameter of the rotation support part 43 gets larger.

Now, the disk surface and the cylindrical surface are provided at the hem sections 437 and 438 of the rotation support part 43. The disk surface extends from the rotational axis 41 in radial direction, and the cylindrical surface extends downward at the periphery of the disk surface in parallel with the rotational axis 41. The first rotation arrows 5 are positioned in which one is at the disk surface and the other is at the cylindrical surface, and are in symmetry with each other with respect to the rotational axis 41. The second rotation arrows 6 are arranged in a similar fashion.

The rotation arrows located on the disk surface are seen from the indication window installed at the keyboard side. The rotation arrows installed on the cylindrical surface are seen from the indication window cut out on the back wall of the main body 2. In this configuration, the first rotation arrows 5 are positioned in symmetry with each other, and so are the second rotation arrows 6 and the indication windows 7. By eliminating the non-symmetric configuration, fabrication process gets easier and the appearance is improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
    a main body;
    a display panel;
    a hinge mechanism coupling the main body and the display panel, the hinge mechanism including (i) a first rotational member that allows the display panel to rotate about a rotational axis with respect to the main body, (ii) a first indicator and a second indicator showing respective directions of rotation with respect to the rotational axis and the directions of the first indicator and the second indicator are opposite to each other; and
    a non-rotating cover surrounding the first rotational member and situated substantially flush with a top surface of the main body, the cover including an indication window to show one of the first indicator and the second indicator provided on the hinge mechanism.

2. The electronic device according to claim 1, wherein the hinge mechanism includes a second rotational member adapted for rotation around a deployment axis to allow the display panel to open/close with respect to the main body and a rotation support part that supports the rotational axis and the deployment axis in a mutually intersecting state.

3. The electronic device according to claim 1, wherein the hinge mechanism comprises a hinge cover including a trunk section coupled to and rotational in concert with the first rotational member, the trunk section including a hem section having the first indicator and the second indicator.

4. The electronic device according to claim 3, wherein the first indicator and the second indicator comprise arrows.

5. The electronic device according to claim 3, wherein the cover is adapted to cover a substantial portion of the hem section of the hinge mechanism.

6. The electronic device according to claim 5, wherein the hinge mechanism further comprises a base plate coupled to the main body and including an aperture within which the trunk section resides, the base plate including a stopper.

7. The electronic device according to claim 6, wherein the trunk section comprises an engaging piece to engage the stopper to halt rotation of the display panel.

8. An electronic device comprising:
    a main body having an input device;
    a display panel;
    a hinge mechanism coupling the main body and the display panel, the hinge mechanism includes (i) a first member adapted for rotation around a rotational axis that allows the display panel to rotate with respect to the main body, and (ii) a plurality of first indicators and a plurality of second indicators showing respective rotational directions with respect to the rotational axis and the directions of the first indicators and the second indicators are opposite to each other, one of the first indicators being located at a side of the input device and the other of the first indicators being located at an opposite side of the input device with respect to the rotational axis; and a non-rotating cover positioned over a portion of the hinge mechanism that includes the plurality of first indicators and the plurality of second indicators, the cover including an indication window to show one of the plurality of first indicators or one of the plurality of second indicators.

9. The electronic device according to claim 8, wherein the hinge mechanism includes a second member adapted for rotation around a deployment axis to allow the display panel to open/close with respect to the main body and a rotation support part that supports the rotational axis and the deployment axis in a mutually intersecting state.

10. The electronic device according to claim 8, wherein the plurality of first indicators and the plurality of second indicators comprise arrows.

11. The electronic device according to claim 8, wherein one of the plurality of first indicators is positioned non-symmetrically to another of the plurality of first indicators with respect to the rotational axis and one of the plurality of second indicators is positioned non-symmetrically to another of the plurality of second indicators with respect to the rotational axis.

12. The electronic device according to claim 8 wherein the cover is substantially planar with a top surface of the main body so as to avoid any openings between the top surface of the main body and a portion of the hinge mechanism including the plurality of first indicators and the plurality of second indicators.

13. The electronic device according to claim 12, wherein the indication window is disposed not to be covered by the display panel when the display panel is overlaid on top of the main body.

14. The electronic device according to claim 8, wherein the cover extends from the main body.

15. The electronic device according to claim 8, wherein the hinge mechanism comprises a hinge cover including a trunk section coupled to and rotational in concert with the first member, the trunk section including a hem section having the plurality of first indicators, the plurality of second indicators and an engaging piece.

16. The electronic device according to claim 15, wherein the hinge mechanism further comprises a base plate coupled to the main body and including an aperture within which the trunk section resides, the base plate including an engaging piece to engage with a stopper and halt rotation of the display panel.

17. An electronic device comprising:
a main body;
a display panel;
a hinge mechanism connecting the main body and the display panel, the hinge mechanism to rotate the display panel around a rotational axis with respect to the main body, the hinge mechanism including a first section and a second section extending from the first section and away from the rotational axis, the second section including a first indicator provided on the hinge mechanism showing a rotational direction with respect to the rotational axis, and a second indicator provided on the hinge mechanism showing a rotational direction with respect to the rotational axis; and
a cover including an indication window that is aligned with one of the first indicator and the second indicator, the cover being stationary and substantially flush with a top surface of the main body so as to cover the second section including the first indicator and the second indicator.

18. The electronic device according to claim 17, wherein the hinge mechanism further supports rotation of the display panel around a deployment axis that is substantially perpendicular to the rotational axis in order to allow the display panel to open/close with respect to the main body.

* * * * *